United States Patent
Scarlin

(10) Patent No.: US 7,179,342 B2
(45) Date of Patent: Feb. 20, 2007

(54) THERMALLY LOADED COMPONENT, AND PROCESS FOR PRODUCING THE COMPONENT

(75) Inventor: Richard Brendon Scarlin, Oberflachs (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/963,793

(22) Filed: Oct. 14, 2004

(65) Prior Publication Data
US 2005/0106407 A1 May 19, 2005

(30) Foreign Application Priority Data
Oct. 14, 2003 (DE) .................. 103 48 422

(51) Int. Cl.
*C21D 8/02* (2006.01)
(52) U.S. Cl. ....................................... 148/530
(58) Field of Classification Search ............... 428/615, 428/679; 148/530
See application file for complete search history.

(56) References Cited

U.S. PATENT DOCUMENTS

| 6,152,697 A | 11/2000 | Konishi et al. | |
|---|---|---|---|
| 2002/0172587 A1* | 11/2002 | Keller et al. ............. | 415/1 |

FOREIGN PATENT DOCUMENTS

| DE | 29 01 338 | 7/1980 |
|---|---|---|
| DE | 30 09 476 | 9/1980 |
| DE | 41 15 230 C2 | 4/1994 |
| DE | 197 41 637 A1 | 3/1999 |
| DE | 199 53 079 A1 | 5/2001 |
| DE | 101 12 062 A1 | 9/2002 |
| EP | 1 008 722 B1 | 9/2003 |

OTHER PUBLICATIONS

Bachelet, E. et al., eds., "High temperature materials for power engineering 1990." Kluwer Academic Publisher. Liege, Sep. 24-27, 1990, pp. 1309-1318, 1461-1490.

* cited by examiner

*Primary Examiner*—Jennifer C. McNeil
*Assistant Examiner*—Gordon R. Baldwin
(74) *Attorney, Agent, or Firm*—Cermak & Kenealy, LLP; Adam J. Cermak

(57) ABSTRACT

A thermally loaded component (10), in particular a rotor for a steam or gas turbine, includes a plurality of component sections which, during operation, are exposed to different temperature levels, a first component section being designed for temperatures of >750° C., a second component section being designed for temperatures of approximately between 750° C. and 600° C., and a third component section being designed for temperatures of <600° C. In a component of this type, the production costs are reduced while at the same time ensuring a sufficient mechanical strength by virtue of the fact that the component (10) includes different materials in the component sections which are subject to different levels of thermal loading, the first component section including a precipitation-hardened nickel-base alloy, the second component section including a solution-annealed nickel-base alloy and the third component section including a high-temperature-resistant steel, and that the component (10) with its different component sections is constructed of individual elements (12, . . . , 17) which are welded to one another and each form a component section.

5 Claims, 3 Drawing Sheets

THERMALLY LOADED COMPONENT, AND PROCESS FOR PRODUCING THE COMPONENT

This application claims priority under 35 U.S.C. § 119 to German application number 103 48 422.1, filed 14 Oct. 2003, the entirety of which is incorporated by reference herein.

BACKGROUND OF THE INVENTION

1. Field of the Invention

The present invention relates to a thermally loaded component and to a process for producing a component of this type.

2. Brief Description of the Related Art

Critical components, such as for example forged rotors or tubes or cast housings for high-temperature steam power plants or components of gas turbines or other turbomachines with operating temperatures of >700° C. have to be produced from nickel-base alloys having the required mechanical and creep rupture strength at these temperatures.

First of all, at temperatures directly above the range of use for high-temperature steels, nickel-base alloys are selected which have a chemical composition enabling them to achieve the desired high-temperature properties in a simple way by solution annealing at a temperature of typically in the vicinity of 1000° C., followed by cooling.

Even higher operating temperatures require even more complex nickel-base alloys which have the required mechanical and creep rupture strength at even higher temperatures (typically >750° C.). These alloys have even more complex compositions enabling them to achieve the desired properties through the formation of stable precipitations. Precipitations of this nature are produced by a heat treatment combined with a precipitation hardening which follows the prior solution annealing and is generally carried out in a temperature range between 700 and 900° C.

Precipitation-hardenable nickel-base alloys of this type have the desired properties for applications in the temperature range >>700° C. but also have a number of drawbacks:

- on account of the lack of manufacturing equipment and on account of their tendency to form cracks during the production, they cannot be produced and processed in the sizes required for large rotors, tubes or housings;
- on account of the wide solidification range of the alloys, they are difficult to weld without the formation of solidification cracks, which would render them unusable (cf. for example: High Temperature Materials for Power Engineering, Liege, 24–27 September 1990, p. 1309, p. 1461, p. 1471 and p. 1481);
- in particular, welding of the fully hardened material promotes the formation of cracks, on account of the low ability of the material to compensate for the differential expansions which occur during welding;
- on account of the elements added, which generate the ability to withstand high temperatures as a result of precipitation reactions, the alloys are expensive.

In the case of large components which are acted on by high temperatures in operation, such as rotors, housings, tubes or the like, there are often regions in which the operating temperature is highest and regions in which the operating temperature is well below the highest operating temperature. For such situations, it has already long been proposed for the components to be assembled (welded together) from a plurality of subsections, which consist of a material matched to the operating temperature of the particular section, in accordance with the operating temperature distribution.

For example, it is known from DE-A1 199 53 079, in order to form a component, for two parts made from high-alloy, heat-resistant martensitic/ferritic steels, austenitic steels or superalloys based on nickel, nickel-iron and cobalt, to be welded together, with at least one of the parts first of all being plated with a filler based on nickel in the joining region, then the plated material being subjected to a quality heat treatment, and finally the parts being welded together using the same filler. In an exemplary embodiment which is explained in greater detail, a first component made from IN706 (Inconel 706), for example a disk of a rotor (assembled from a plurality of disks) in the solution-annealed state is plated with the filler SG-NiCr20Nb by means of submerged arc welding with wire. Then, the plated IN706 disk is subjected to a heat treatment which is required to ensure its quality (stabilization anneal at 820±15° C., cooling to RT, precipitation hardening at 730±15° C., cooling to RT). The plated IN706 disk is then welded to a further plated disk made from the high-alloy martensitic/ferritic steel St13TNiEL, with the root layers being applied by means of TIG welding and the reinforcing layers being applied by means of submerged arc wire welding. Then, the welded component undergoes a stress-relief anneal at 610±15° C.

DE-A1 101 12 062 proposes a process for welding together two parts which are subject to different levels of thermal loading and are intended in particular for a turbomachine. The first part consists of steel and the second part consists of a nickel-base alloy. In the process, prior to welding, first of all an interlayer is applied to the second part made from the nickel-base alloy, in which interlayer the additional elements which are present in the nickel-base alloy and are responsible for the formation of cracks decrease progressively from the inside outward. The second part preferably consists of IN625 (Inconel 625). The interlayer composed of a plurality of individual layers preferably consists of IN617 (Inconel 617).

Furthermore, it is known from U.S. Pat. No. 6,152,697 to assemble a welded rotor, in the sections which are subject to different levels of thermal loading, from more than two individual elements consisting of different materials. A 12Cr steel is used for the section exposed to the highest temperature, and a 2.1/4CrMoV steel and a 3.1/2NiCrMoV steel are used for sections which are subject to lower levels of thermal loading.

The known solutions cannot be used to realize economic solutions for operating temperatures of over 750° C.

SUMMARY OF THE INVENTION

Therefore, one aspect of the present invention includes providing a component which is thermally loaded in operation and is exposed to different temperatures in different sections and which can be produced easily and inexpensively, can withstand temperatures of over 750° C. in the section which is exposed to the highest temperature, and is distinguished by a high mechanical strength, and also providing a process for producing a component of this type.

One of many principles of the present invention includes forming the component using different materials in the component sections which are subject to different levels of thermal loading, a first component section for temperatures of >750° C. consisting of a precipitation-hardened nickel-base alloy, a second component section for temperatures between 750° C. and 600° C. consisting of a solution-annealed nickel-base alloy and a third component section for temperatures <600° C. consisting of a high-temperature-resistant steel, and the component with its different component sections is constructed by means of individual elements which are welded to one another and each form a component section.

A particularly good strength is achieved by virtue of the fact that the individual elements are joined to one another by weld seams, which as filler each contain a solution-annealed nickel-base alloy if at least one of the individual elements joined by the weld seam consists of a nickel-base alloy.

An exemplary configuration of a process according to the principles of the present invention is distinguished by the fact that the individual element which forms the first component section is solution-annealed before the interlayer is applied and is precipitation-hardened after the interlayer has been applied.

BRIEF DESCRIPTION OF THE DRAWINGS

The invention is to be explained in more detail below on the basis of exemplary embodiments in conjunction with the drawing, in which.

DETAILED DESCRIPTION OF THE PREFERRED EMBODIMENTS

Figure 1:
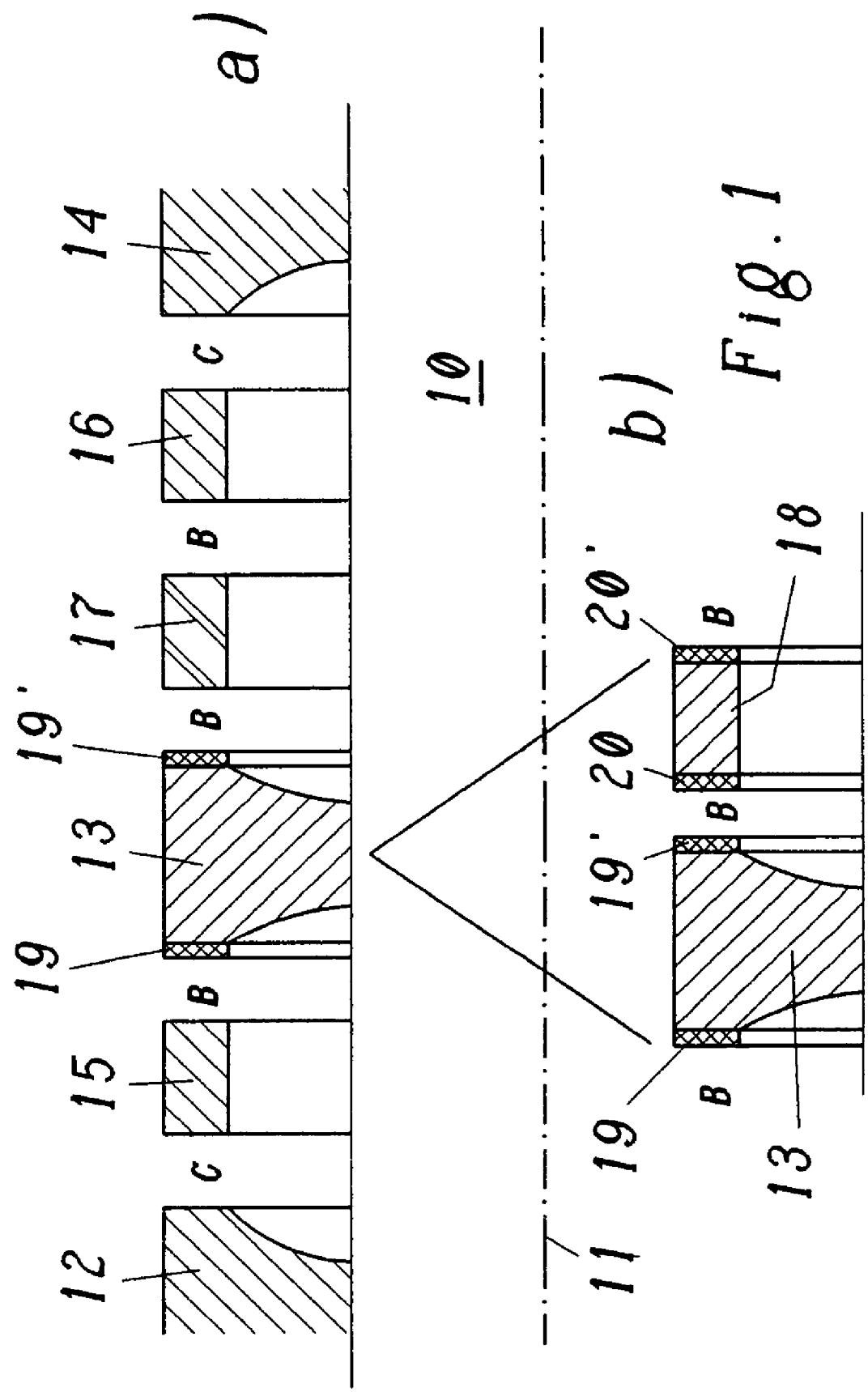
FIG. 1 in subfigure (a) shows a longitudinal section through the as yet unwelded parts of a rotor in accordance with a preferred exemplary embodiment of the invention, with the fillers used at the joining locations being indicated by capital letters (B, C); subfigure (b) shows a variant for the central part of the rotor from subfigure (a)

The intention of the exemplary solution according to the principles of the present invention is to ensure that:
- the quantity of precipitation-hardenable nickel-base alloys used is limited by the alloy being employed only in the section which is exposed to the highest temperature loading and is welded to less expensive materials in sections which are subject to lower levels of loading,
- the precipitation-hardenable nickel-base alloys are welded in the solution-annealed state (low strength, high ductility) and only acquire their full strength as a result of subsequent heat treatments, it being possible to use any desired fusion welding process, such as TIG, MIG, MAG, electron beam welding, laser welding, etc.,
- the tendency to form cracks in the precipitation-hardened alloys is minimized by interlayers (cladding layers) comprising a nickel-base alloy of lower strength being introduced; the introduction of the interlayers means that the mechanical limitations are low and only low stresses are produced, so that the formation of cracks in the precipitation-hardened material is avoided; the tendency to form cracks is also reduced by virtue of the fact that only a very small amount of the precipitation-hardened nickel-base alloy is melted during the build-up welding of the interlayers, so that only a low level of the elements which cause crack formation during solidification, such as Ti and Al, are present in the weld melt; this is the case in particular if a build-up welding technique with little introduction of heat is used,
- solution-annealed nickel-base alloys with a relatively low heat resistance are used at temperatures of typically <750° C., and
- 9–12% Cr steels are used at temperatures of typically <600° C., in order to minimize costs and achieve good welding properties.

For components (rotors, tubes, housings, etc.) of steam power plants, which operate at temperatures of up to 800° C., by way of example the following materials can be used in the three component sections which are assigned to the three different temperature ranges (T>750° C., 750° C.>T>600° C., T<600° C.):

(A) a precipitation-hardened nickel-base alloy, such as for example Waspalloy™, which is usually heat-treated in three steps at approx. 1050, 850 and 760° C.;

(B) a solution-annealed nickel-base alloy, such as for example IN617 (Inconel™ 617), which is usually heat-treated in one step at approx. 1050° C.;

(C) a 10% Cr steel, which is ideally heat-treated in two steps at approx. 1050 and 700° C.

The following process is used to produce joins between material A and material A or between material A and material B or between material A and material C or between material B and material C:

Material A is used in the solution-annealed state (solution annealing at 1050° C.) and provided (clad) with an interlayer of material B at the joining surfaces by build-up welding.

The workpiece which has been prepared in this way, after the build-up welding, is heat-treated at typically 850° C., in order to reduce the stresses which occur during welding and at the same time to reach the full strength of the precipitation-hardened material A.

The clad material A can then be welded to the material B or C.

This joining by welding can typically be carried out using a nickel-base alloy as weld metal or filler, the nickel-base alloy already reaching its full strength as it cools from the molten state during welding. A suitable nickel-base alloy is a material such as material B, i.e. for example IN617.

Welded joints can be produced between materials B and C in the same way and using the same filler.

Welded joints between material C and material C can be produced by modified electrodes (typically 9–12% Cr composition); then, a heat treatment which is suitable for material C is carried out, for example at 680° C., and this treatment simultaneously also improves the properties for certain materials A, e.g. Waspalloy™.

In this way, it is possible to achieve an ideal combination of materials, in which the materials which are optimum for the particular temperature range and mechanical load are used while at the same time the costs are reduced. Each material is heat-treated at close to ideal temperature before welding and after welding, resulting in a high mechanical and creep rupture strength while minimizing residual stresses.

The following exemplary solution according to the principles of the present invention is to be explained below on the basis of the example of a rotor:

FIG. 1*a*) shows an excerpt from a longitudinal section through various individual elements 12, . . . , 17 which are arranged in a row along a rotor axis 11 and from which the rotor 10 is welded together. The various individual elements comprise three (circular) rotor disks 12, 13 and 14 and three (circular) rotor rings 15, 16 and 17 which are arranged between the rotor disks 12, 13, 14. In the example illustrated, the central rotor disk 13 is made from material A. The other two rotor disks 12 and 14, like the rotor rings 15 and 16, are made from material C. The third rotor ring 17 is made from material B. Materials B and C or the like are also—as indicated in FIG. 1—used as fillers or weld metals in the welded joints between the rotor rings and rotor disks.

Figure 2:
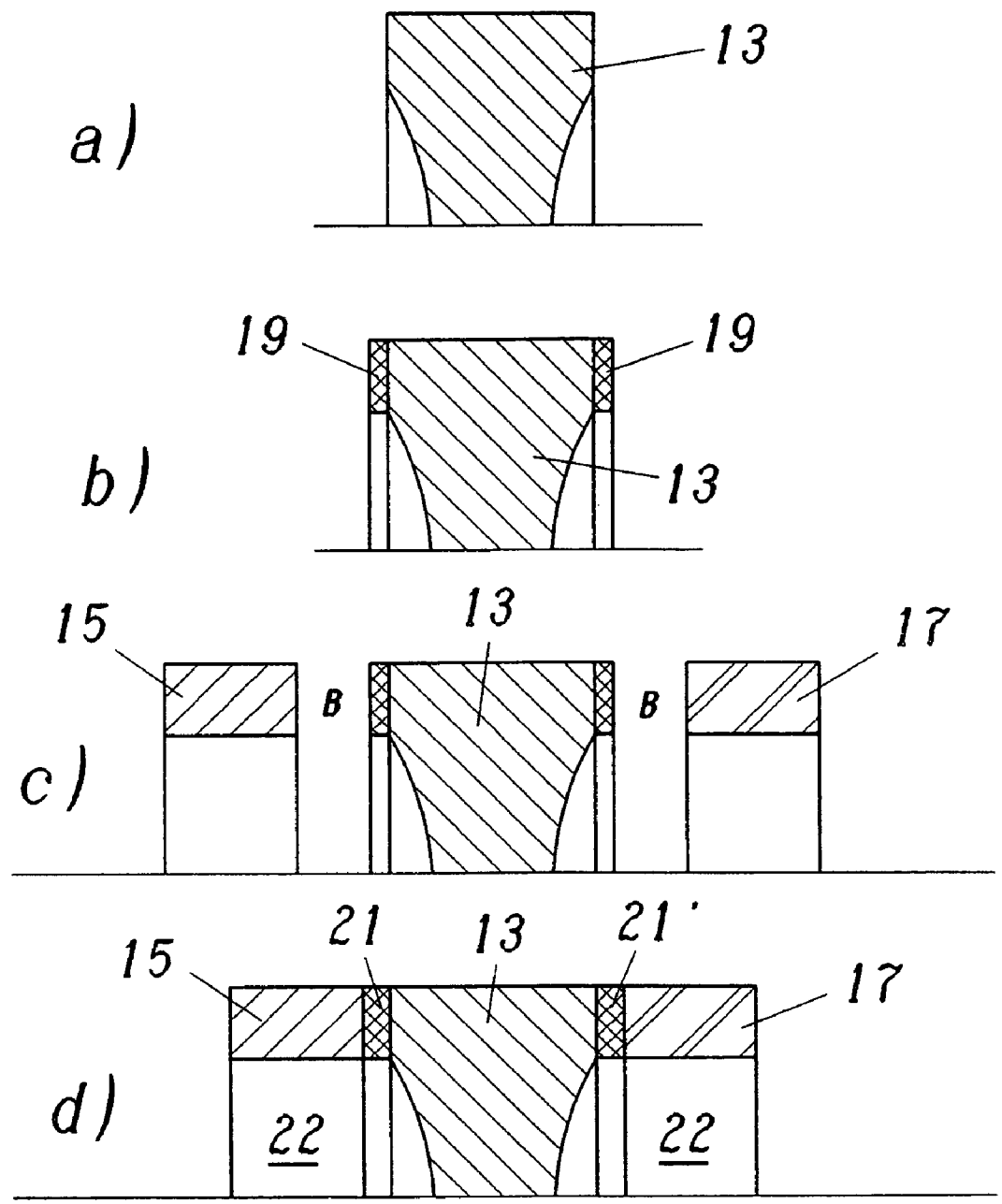
FIG. 2 in a number of subfigures (a) to (d) shows various steps up until an intermediate stage in the production of the rotor as shown in FIG. 1.
Figure 3:
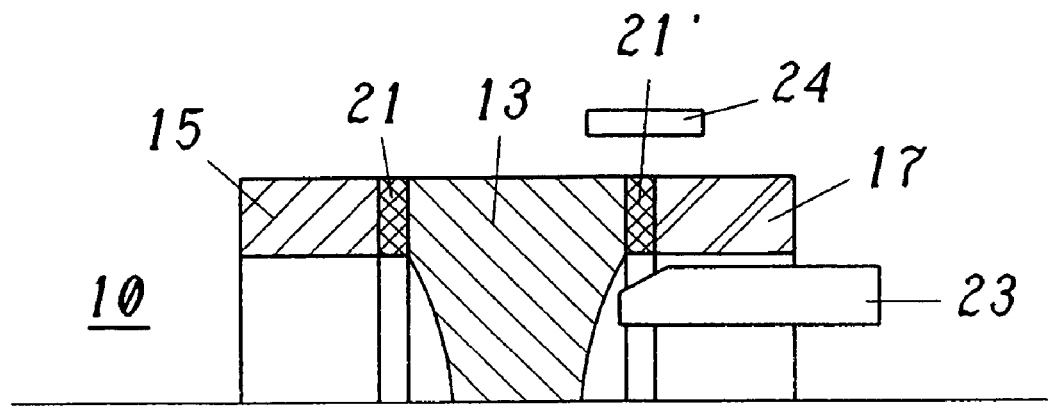
FIG. 3 shows the X-ray examination of the weld seam in the intermediate stage shown in FIG. 2(*d*)
Figure 4:
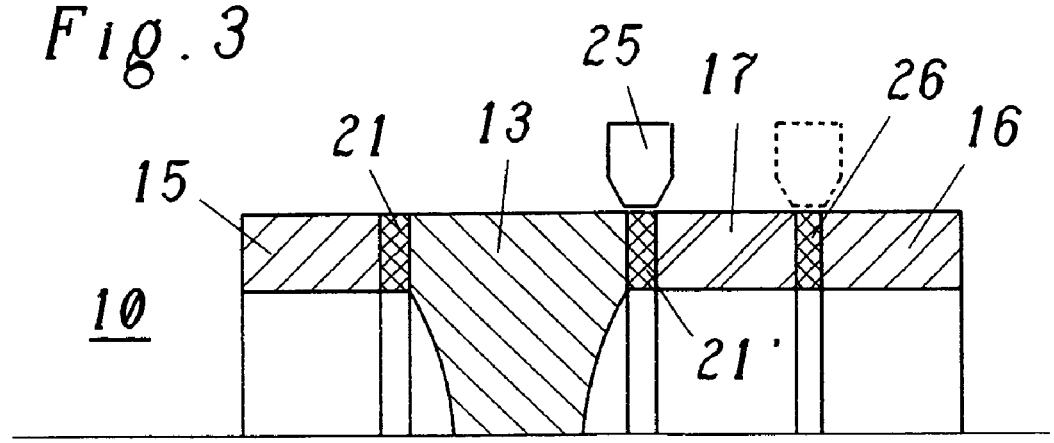
FIG. 4 shows the ultrasound testing from the outside in a subsequent intermediate stage.

FIGS. 2 to 4 illustrate the production steps involved in assembling the rotor 10 shown in FIG. 1a), in which only the central rotor disk 13 consists of material A. However, it is also conceivable, in accordance with FIG. 1b, to provide a combination of a central rotor disk 13 and an adjoining rotor ring 18 which both consist of material A and are provided with interlayers 19, 19' and 20, 20', respectively, prior to welding, instead of the central rotor disk 13.

During production of the rotor 10, in accordance with FIG. 2a, the starting point is the central rotor disk 13 made from material A which has been solution-annealed at 1050° C. Then, interlayers (cladding layers) 19, 19' formed from material B are applied at what will subsequently form the joining locations, by build-up welding (FIG. 2b). After the build-up welding of the interlayers 19, 19', the rotor disk 13 is held at typically 850° C. in order to relieve the stresses produced during welding and to approximately reach the full strength of material A by precipitation hardening. Then, the rotor disk 13, in accordance with FIGS. 2c and 2d, is welded to the adjacent rotor rings 15 and 17, which consist of material C and B, respectively. A material of type B, such as for example IN617, is used as filler for the welding operation and reaches its full strength during cooling from the molten state during welding.

The weld seams 21, 21' which form (FIG. 2d), since the rotor rings 15, 17 surround a cavity 22 which is still accessible from the outside, are now accessible both from the outside and from the inside. This fact can be made use of in order to subject the weld seams to an accurate and careful quality inspection by means of a nondestructive testing method. This is shown in FIG. 3 for the weld seam 21' using the example of an X-ray test: an X-ray source (X-ray tube) 23 is pushed into the cavity in the rotor ring 17, so that the X-radiation which is emitted can penetrate radially through the weld seam 21' from the inside outward. The image of the weld seam 21' is recorded by means of an externally arranged X-ray recording apparatus 24, e.g. an X-ray film, and can then be evaluated. In the arrangement shown in FIG. 3, it is also possible for the X-ray source 23 and X-ray recording apparatus 24 to swap places. Of course, it is also conceivable to use suitable electronic recording and evaluation apparatus.

Figure 5:
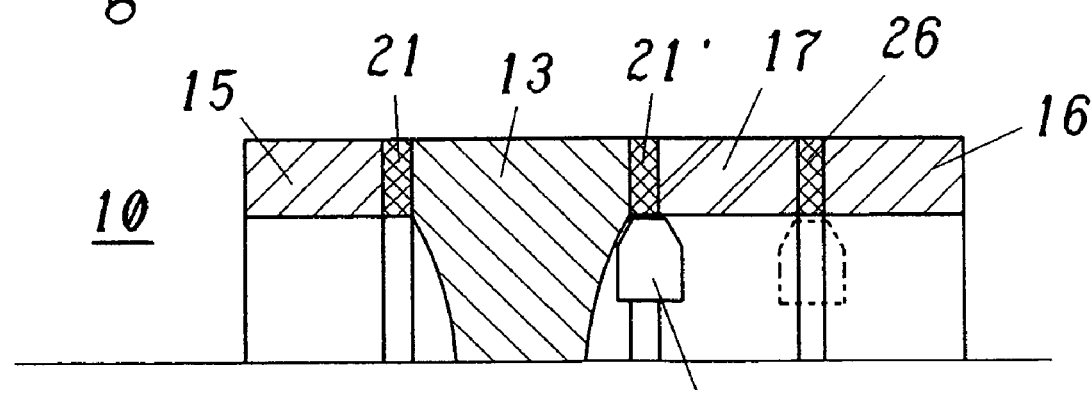
FIG. 5 shows the ultrasound testing from the inside in a subsequent intermediate stage.

However, unimpeded access to the inner side of the rotor rings or weld seams is also advantageous when using ultrasound testing methods: if the weld seams contain fillers of material type B (nickel-based), given the required wall thicknesses for the rotor, complete testing is only possible, on account of the relatively high absorption of sound in the weld seam, if the testing is carried out from the inside and the outside. The ultrasound testing of the weld seam 21' from the outside and the inside by means of an ultrasound measuring head 25 is illustrated in FIGS. 4 and 5.

The next weld seam 26, between the two rotor rings 16 and 17, which likewise contains filler of type B, may also be tested by means of ultrasound from the inside and outside (ultrasound measuring head illustrated by dashed lines). Only when these tests have been successfully concluded can the cavities 22 surrounded by the rotor rings 15, . . . , 17 be closed up by welding on the next rotor disks 12 and 14 made from material C. The weld seams produced contain only filler of type C and can therefore be tested only from the outside by means of ultrasound without this presenting any difficulties.

LIST OF DESIGNATIONS

| | |
|---|---|
| 10 | Rotor |
| 11 | Rotor axis |
| 12, 13, 14 | Rotor disk |
| 15, . . . , 18 | Rotor ring |
| 19, 19' | Interlayer (cladding layer) |
| 20, 20' | Interlayer (cladding layer) |
| 21, 21', 26 | Weld seam |
| 22 | Cavity |
| 23 | X-ray source |
| 24 | X-ray recording apparatus (e.g. X-ray film) |
| 25 | Ultrasound measuring head |
| B, C | Material |

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A process for producing a thermally loaded component, wherein the thermally loaded component comprises:
   a plurality of component sections which, during operation, are exposed to different temperature levels, including
   a first component section configured and arranged for temperatures of >750° C.,
   a second component section configured and arranged for temperatures of approximately between 750° C. and 600° C., and
   a third component section configured and arranged for temperatures of <600° C.;
   wherein the component sections which are subject to different levels of thermal loading comprise different materials,
   the first component section comprising a precipitation-hardened nickel-base alloy,
   the second component section comprising a solution-annealed nickel-base alloy, and
   the third component section comprising a high-temperature-resistant steel;
   the process comprising:
   welding together at least thee individual elements which, after said welding, together form said first, second, and third component sections;
   applying an interlayer of a solution-annealed nickel-based alloy in the region of the subsequent weld seam, to weld the individual element which forms the first component section to an individual element which forms another component section;
   solution annealing the individual element which forms the first component section before applying the interlayer; and
   precipitation-hardening said individual element which forms the first component section after applying the interlayer.

2. The process as claimed in claim 1, wherein the thermally loaded component further comprises weld seams joining together the individual elements, the weld seams each containing a solution-annealed nickel-base alloy filler when at least one of the individual elements joined by a weld seam comprises a nickel-base alloy.

3. The process as claimed in claim 2, wherein the thermally loaded component further comprises a rotor having a plurality of rotor rings and rotor disks comprising said individual elements arranged one behind the other on a rotor axis and welded to one another, wherein each of the individual elements joined by a weld seam comprises a rotor ring when the weld seam contains a filler comprising solution-annealed nickel-base alloy.

4. The process as claimed in claim 1, wherein the thermally loaded component comprises a rotor for a steam turbine or a gas turbine.

5. The process as claimed in claim 1, wherein applying comprises build-up welding said interlayer.

* * * * *